United States Patent [19]

Ferrer

[11] 4,447,128

[45] May 8, 1984

[54] DIFFRACTION HEAD UP DISPLAY SOLAR RADIATION FILTER

[75] Inventor: John J. Ferrer, Los Angeles, Calif.

[73] Assignee: Hughes Aircraft Company, El Segundo, Calif.

[21] Appl. No.: 446,538

[22] Filed: Dec. 3, 1982

[51] Int. Cl.³ .............................................. G02B 27/14
[52] U.S. Cl. ...................................... 350/174; 350/354
[58] Field of Search .............. 350/169, 172, 174, 354, 350/342, 331 R, 363, 276 R, 276 SL, 311

[56] References Cited

U.S. PATENT DOCUMENTS

| | | | |
|---|---|---|---|
| 3,620,601 | 11/1971 | Waghorn | 350/174 |
| 3,744,879 | 7/1973 | Beard et al. | 350/3.74 |
| 3,915,548 | 10/1975 | Opittek et al. | 350/331 R |
| 3,940,204 | 2/1976 | Wirthrington | 350/174 |
| 3,949,490 | 4/1976 | Derderian et al. | 350/174 |

Primary Examiner—Bruce Y. Arnold
Attorney, Agent, or Firm—R. Thompson; L. V. Link, Jr.; A. W. Karambelas

[57] ABSTRACT

A diffraction grating head up display is disclosed which blocks solar radiation from impinging upon and washing out the image of display information on an optical display device. This is accomplished by means of a filter such an optical element made of photochromic material which is positioned between the display information surface and relay optics lenses, preferably at the back focal plane thereof, so that focused solar radiation darkens a localized spot in the photochromic material. The darkened spot blocks the solar energy but reversibly lightens after the focused solar energy is removed. This photochromic material allows substantially unimpeded transmittance of the image of the display information except at the darkened spot. Also included in the optical system are a folding reflector and a combiner lens element which combines and superimposes the image of the display information on the scene being viewed when an observer looks through the combiner element. This combiner element is a diffraction grating holographic lens which is reflective or diffractive of a narrow bandwidth of light which includes the narrow bandwidth light of the display information.

12 Claims, 4 Drawing Figures

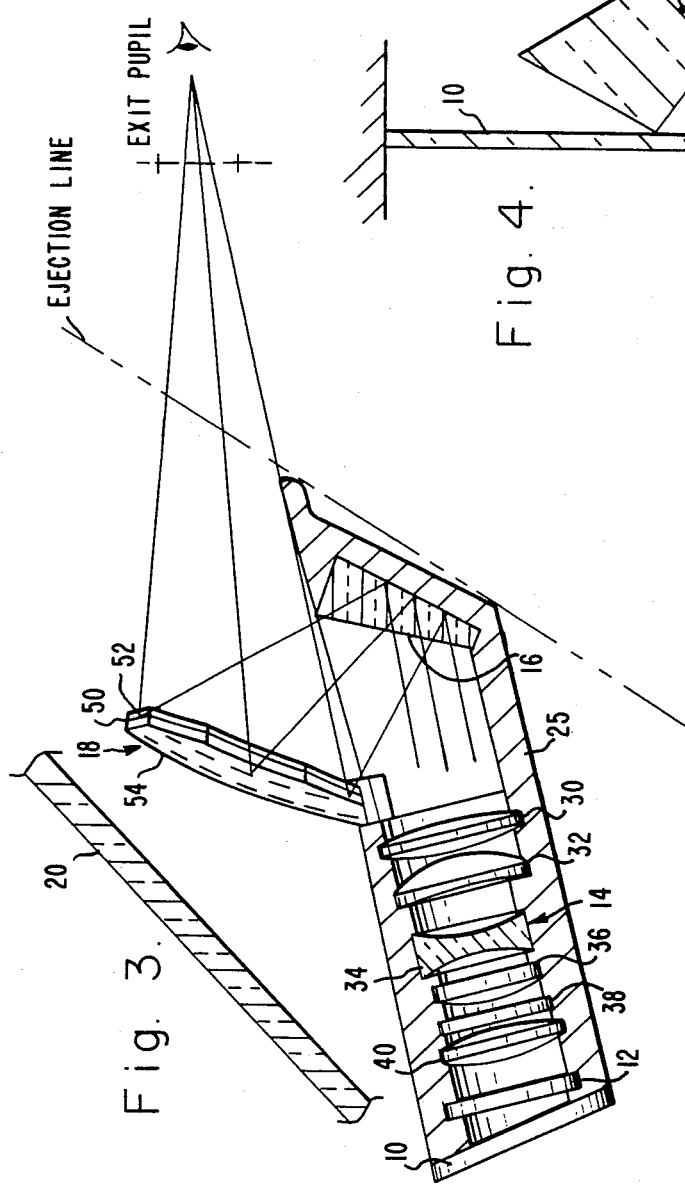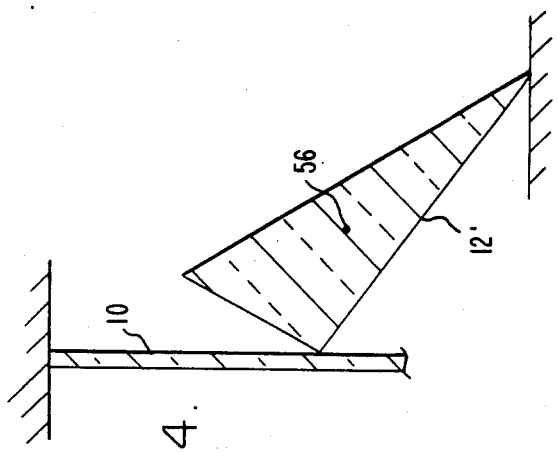

DIFFRACTION HEAD UP DISPLAY SOLAR RADIATION FILTER

TECHNICAL FIELD

This invention is directed to a diffraction optics display unit which filters out solar radiation.

BACKGROUND OF THE INVENTION

The invention is embodied in a head up display unit to filter out solar radiation capable of washing out the display information.

Typically, in a head up display (hereinafter also referred to as a HUD) of the type exemplified by the description in U.S. Pat. No. 3,940,204 issued on Feb. 24, 1976 to R. J. Withrington et al and entitled "Optical Display Systems Utilizing Holographic Lenses", an observer in a cockpit looks through a holographic diffraction grating lens at a scene. An image of display information from a source, such as a cathode ray tube located in the aircraft out of the line of sight, is combined with and superimposed on the scene by means of an optics system which includes relay optics, a folding reflection and the holographic lens. In operation, the optics system directs the image of the display information to the holographic lens where it is diffracted or reflected from the holograph lens to the viewer's eyes whereupon it is effectively combined with the scene. As a result of this combining function the holographic lens will hereinafter also be referred to as a combiner.

Head up displays of this type can be subjected to solar noise in the form of solar radiation which, when the sun is within a range of certain critical incident angles, will pass back down the optical path to wash out the display information on the cathode ray tube.

A number of possible solutions to this solar noise problem have been investigated, but most work effectively only over a limited angular range of incident angles of incoming radiation. Examples are narrowband reflection or transmission filters. A typical narrowband transmission filter is made of a high index of refraction material, typically thin layers of metals and dielectrics, which provides a narrow bandpass with high transmittance. This type of filter is preferably tilted across the optical axis in front of the relay optics with the cathode ray tube being positioned in back of the relay optics. In operation, this filter reduces the amount of solar radiation which is directed to the face of the cathode ray tube over a limited range of incoming sun ray angles.

Another approach is to use a narrowband reflecting mirror which operates somewhat similarly to the tilted transmission filter but in a reflection rather than a transmission mode. Often the mirror includes a layer of absorption glass positioned before the dichroic mirror reflection surface. Again the disadvantage of this approach is the limited angular range of effectiveness.

Other solutions which have been investigated but which have not proven successful are a moving mechanical blocking apparatus and a venetian blind type of blocking element.

SUMMARY OF THE INVENTION

The invention is directed to a solar filter in a head up display which will block incoming solar radiation from washing out display information. It includes, for example, a photochromic element which is positioned in or near a back focal plane in the optical system so that solar radiation transmitted back down an optical path toward the surface of a display device is focused on a small portion of the photochromic element. This causes the photochromic element to reversibly darken at the point of focus thereby blocking the solar energy. The remaining area of the solar filter on which solar radiation is not focused, transmits the lower intensity display information.

More specifically, in a diffraction head up display the display information on a cathode ray tube is within a narrow bandwidth of light and its image is focused forward along an optical path through the solar filter, through a relay lens system and to a folding mirror from which it is reflected to the combiner lens. The combiner lens includes a diffraction grating element which directs, by diffraction, only a narrow bandwidth of light which includes the wavelengths of the display information. This diffracted image is then directed to an exit pupil for viewing.

When broad spectrum solar radiation shines on the other side of the combiner lens, the combiner rejects by diffraction that portion of the sunlight which is in the narrow bandwidth of the display information. But the combiner transmits the remainder of the broad spectrum solar energy.

When the sun is within a range of overhead angles, this remainder of the solar energy could otherwise wash out the display information by passing back down the optical path to the face of the cathode ray tube. However this wash out is prevented by the filter of this invention. This filter is placed in the back focal plane of the relay optics, so that any solar radiation which passes back down the optical path is focused on a very small spot on the filter. Because the photochromic material of the filter darken with the high energy density at the point of focusing, the solar energy is effectively blocked from reaching the cathode ray tube face.

An advantage to this filter is that it will block solar energy for any angle of the sun relative to the head up display. As the sun's incident angle continuously changes, the focused spot correspondingly moves across the solar filter blocking solar energy at the darkening rate of the photochromic material. When the focused solar energy moves from a given filter area, the reversible photochromic material lightens again.

Another advantage of this invention is that the darkened spot within the photochromic material is small enough so that it will not usually result in a significant blocking of the display information. For example, a viewer with two eyes will see past the darkened spot to every display point with at least one eye and thus will not lose any display information. Furthermore, even if the darkened spot did cover a critical viewing area for a given eye, the viewer could move his head and eye laterally relative to the viewing axis to see the display information that had been previously blocked.

Still another advantage of this invention is that the solar filter element can be positioned along the optical axis in back of the relay optics without adding to the optical path length. Thus, the overall dimension of the head up display unit can be kept short and within the space constraints of an aircraft cockpit.

BRIEF DESCRIPTION OF THE DRAWINGS

In the accompanying drawings:

FIG. 3 is a schematic side elevation view illustrating a preferred embodiment of the HUD optics system in more detail; and FIG. 4 is a second embodiment of the solar filter.

DETAILED DESCRIPTION OF THE INVENTION

Figure 1:
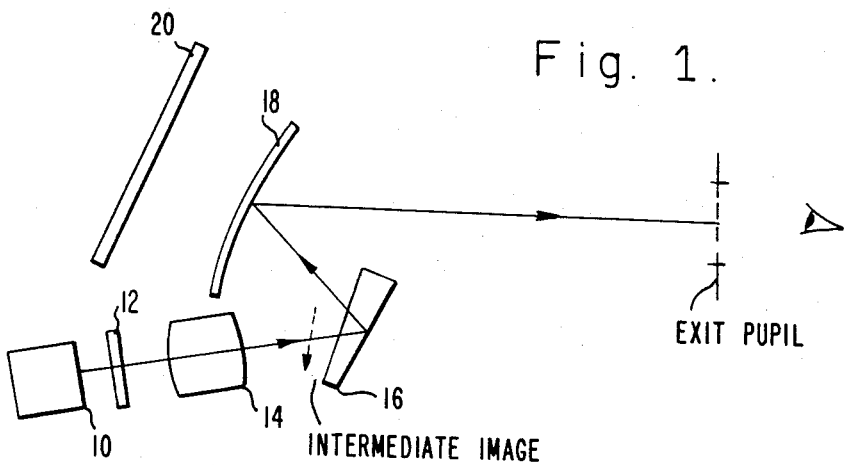
FIG. 1 is a schematic, side elevation view, of a head up display, optical system illustrating the display of information from a cathode ray tube to the eye of a viewer.

Referring now to the drawings in more detail, FIG. 1 schematically illustrates the HUD optical system in which information displayed on an image surface such as the faceplate of a cathode tube, is focused forward or upstream to an exit pupil which can be thought of as an area in space. Hereinafter, the terms "up" and "forward" will be used to describe the direction of ray tracing from the cathode ray tube toward the exit pupil; and the terms "down", and "back" shall be used to describe the opposite direction of ray tracings toward the cathode ray tube. A viewer, such as a pilot, positions his eye within this exit pupil so as to view the image from the cathode ray tube 10 as combined with and superimposed on the scene ahead of the vehicle.

More specifically, the cathode ray tube 10 has a faceplate which includes a phosphor which produces an image within a narrow bandwidth of light centered at a wavelength $\lambda_0$ which is preferably around 543 nanometers. This is in the green portion of the spectrum for visible light. While tilting of the faceplate of the cathode ray tube 10 does not form a part of the invention it has been known that such tilting does improve the performance of the optical system.

The relatively low intensity light of the display from the cathode ray tube 10 is transmitted through the solar filter 12. In the preferred embodiment, this solar filter 12 is a plate of photochromic material of a type, for example, which will be described in more detail with reference to FIG. 3. This solar filter 12 is preferably positioned in the back focal plane of the relay optics 14.

The relay optics receive the light of the display transmitted through the solar filter. The relay optics 14 comprises a series of lenses which are configured to partially compensate for aberrations in the holographic lens system. The light of the display from the relay optics 14 is directed to a folding reflector 16.

The folding reflector 16 can be a mirror or prism which partially corrects the intermediate image and serves to reduce the overall length of the optical system.

The intermediate image received via the folding reflector 16 is reflected to a combiner 18 positioned between a wind screen 20 and the eye of a viewer. This combiner 18 is a holographic diffraction optics lens which reflects light that is within a narrow bandwidth and is substantially transmissive to light of all other wavelengths according to the well-known laws of Bragg diffraction. One method of fabricating this combiner 18 is explained in more detail in U.S. Pat. No. 3,940,204 and will not be repeated here.

In operation, the combiner 18 reflects the narrow bandwidth light from the display to the exit pupil. Thus, the display image is in effect combined with and superimposed on the scene in front of the vehicle, as viewed through a wind screen 20 by the viewer. Since the combiner 18 is tuned to reflect light in the preferred bandwidth centered at around $\lambda_0$, this portion of the broad bandwidth light from the scene is removed.

Figure 2:
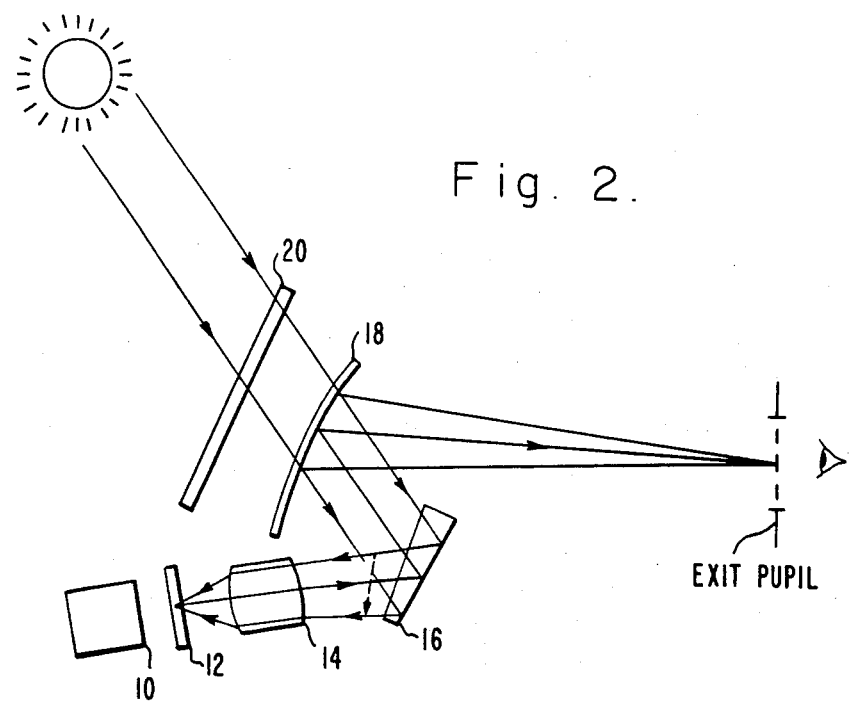
FIG. 2 is the schematic side elevation view of the system of FIG. 1 illustrating ray traces for the backward focusing of solar radiation toward the display information on the face of the cathode ray tube.

Referring now to FIG. 2, when the sun is within certain critical angles, solar noise in the form of the broad spectrum solar radiation is transmitted through the combiner 18 and travels back down through the optical system toward the face of the cathode ray tube 10. However, the solar filter 12 effectively blocks this solar radiation thereby preventing it from washing out the display information on the face of the cathode ray tube 10.

More specifically, the broad spectrum solar radiation shining on one face of the combiner 18 has a narrow bandwidth notched out by the reflecting capabilities of the combiner 18. As previously stated, the reflective capabilities of the combiner 18 are tuned to a bandwidth that includes the wavelength $\lambda_0$. Thus, this portion of the solar radiation spectrum is reflected off of the face of the combiner element 18 and the remainder is transmitted down through the optical system to the folding reflector 16, along the optical axis through relay optics 14, and to the solar filter 12. Of course, it is also possible that the incident angle of solar radiation could be beyond the bounds of the combiner element 18 and still shine back down the optical path.

The solar filter 12 is preferably positioned at the back focal plane of the relay optics 14. Consequently, the solar energy is focused at a point or spot within the body of the solar filter 12. As a result, the photochromic material of the solar filter 12 turns dark at the focal point thereby creating a darkened portion which effectively blocks the solar energy. Consequently, the solar energy can not strike the face of the cathode ray tube 10 where it could otherwise have washed out the display image.

Moreover, as the relative angle of the sun moves, the focal point for the solar energy also moves. As a result, the darkened area moves through the solar filter 12 at the reaction rate of the photochromic material and reversibly lightens and clears from its previously darkened condition at the recovery rate of the photochromic material when the focused solar radiation is removed from the spot. Consequently, there is continued correction for the relative movement of the solar energy within the whole range of critical solar angles.

Of course, an image of the darkened spot is focused upstream and can be seen through the exit pupil as a spot in space which has a tendency to block the display information. Since this spot has a very small diameter (typically 0.08 inches or less), the binocular vision of the viewer is such that he can usually see around the spot. Moreover, if the image of the spot is at a critical viewing angle or if the "comet-tail" effect created by the finite recovery time of the photochromic material is such that binocular vision is not able to compensate for the slight blockage in viewing, the viewer merely has to move his head to reposition his eyes laterally relative to the optical axis thereby enabling him to see past the image of the darkened spot.

FIG. 3 is a detailed description illustrating a preferred embodiment of an optical system constructed for a particular purpose. Of course, it should be understood that modifications can be made in this configuration for other purposes and that the solar filter 12 would be equally applicable.

As stated previously, the image display surface 10 is preferably the face of a cathode ray tube which has a phosphor which produces a light image of a very narrow bandwidth centered at a wavelength of about 543 nanometers. Of course, it should be understood that the image could be produced by another type of display such as, for example, a liquid crystal display projector or other displays which create light of sufficient brightness and at the proper wavelength to be focused through the optical system and diffracted to the exit pupil.

A housing 25 encloses the face of cathode ray tube 10, solar filter 12, relay optics 14, folding reflector 16 and has an opening which allows the rays of the intermediate image from the folding reflector to be directed to combiner 18. Moreover, the housing 25 supports the enclosed optical elements.

The solar filter 12 is a flat plate of photochromic material which is substantially transparent to the image of the display information in that the intensity of the narrow bandwidth display information is significantly lower than the intensity of any broad spectrum solar energy which is focused on a spot within the solar filter 12. While the solar filter 12 is shown as a thin, flat plate, it must have sufficient thickness and shape so that the solar radiation focused downstream through relay optics 14 is concentrated on a small portion of the solar filter 12. Thus, the solar filter 12 is positioned so that the focal point of solar radiation is within the solar filter material or at least very near to it. Thus, the back focal plane of the relay optics is the preferred location for the solar filter 12.

The material of the solar filter 12 is preferably a photochromic glass which changes transmittance reversably, under the action of light. The host material in one particular glass is silicon glass and the active materials are considered to be silver halide crystals formed by the crystallization from the glassy matrix during initial cooling or subsequent heat treatment of the glass. The amount of silver can be typically 0.5% or less and the crystal size is small compared to a wavelength of light so that scattering is not of concern. Photochromic glasses of this type are described in the article by G. K. Megla, "Exploitation of Photochromic Glass", *Optics and Laser Technology*, Apr. 1974, pp. 61–68.

With the particular material, the darkening time should be relatively fast in response to the high intensity, broad spectrum, focused solar radiation directed to it. The clearing rate should also be relatively fast in the area from which the focused light is removed in order to reduce the "comet-tail" effect.

The relay optics 14 include a series of lenses disposed along the optical axis. One set of lenses that could be used are those disclosed in U.S. Pat. No. 3,940,204 relative to FIG. 16 thereof. Specifically, the relay lenses 14 include positive spherical lens elements 30, 32, 36 and 40, a negative spherical lens element 34 and a negative cylindrical lens element 38. The curvature of the negative cylindrical lens elements are illustrated in the side view of FIG. 3, but it is within the scope of this invention that the lens elements may be positive.

The cylindrical lens element 38 corrects the residual axial astigmatism in the combiner 18. It is to be noted that this lens element 38 can be replaced by a cylindrical surface on one or more of the positive spherical lens elements in the relay optics 14. The axial coma is best corrected in the illustrated arrangement by a decentration of the negative spherical lens 34. It is to be noted that axial coma can be corrected by decentering any appropriate lens in the relay optics 14.

The folding reflector 16 is a prism which provides a partial correction to axial coma. However, this is not its main purpose. The prism 16 is a wedge with a mirror on its rear surface. Rays of the image at the top of the intermediate image transverse a thicker wedge of glass than those rays imaged at the bottom of the intermediate image. This reduces considerably the tilt of both the intermediate image focal surface and, hence, also reduces the tilt of the object surface. The final tilt of the object surface in the illustrated configuration can be about 15° but would otherwise have been over 30° if a prism were not used. The rays of the intermediate image are directed from this prism 16 to the combiner 18.

The combiner 18 can have its diffraction grating pattern constructed, for example, by means of the holographic optics disclosed in U.S. Pat. No. 3,940,204. Structurally, the combiner 18 includes a layer 40 of photosensitive organic material such as dichromated gelatin or photographic emulsion which has the diffraction grating pattern recorded on it. A more detailed discussion of such materials and holographic recording can be found in a book by Robert J. Collier et al., *Optical Holography*, (New York: Acacemic Press, 1971), p. 293 et seq. This thin layer 40 is sandwiched between two layers of glass 42 and 44 which provide structural strength and protect it from physical damage. The overall combiner 18 has a generally spherical or concave configuration such that the intermediate image of the display information is reflected from the concave surface toward the exit pupil.

Functionally, the diffraction grating pattern will diffract and reflect light with a high optical efficiency in a narrow band in accordance with the well-known principles of Bragg diffraction. However, the combiner 18 exhibits a high transmittance of light outside of this narrow band of reflected light thus permitting the pilot to view the outside scene at the same time he is viewing the reflected display information. Consequently, the display information appears to be combined with and superimposed on the scene being viewed. Moreover, the spherical shape of the combiner 18 is such that it balances with the other optical elements of the optical system such that both axial coma and axial astigmatism are corrected in the image of the display information reflected to the exit pupil.

While the combiner 18 has been described as a reflective type diffraction pattern, it is possible to use a transmissive type which redirects the light waves in the manner exemplified in U.S. Pat. No. 3,915,548 issued to E. F. Opittek et al on Oct. 28, 1975.

As previously stated, by placing the solar filter 12 between the faceplate of the cathode ray tube 10 and the relay lenses 14, it is possible to shorten the length of the optical axis thereby making the optical system compact. As a result, it is possible to keep the optical system out of the path of the ejection line as shown in the dashed-lines in FIG. 3. Thus, some of the space constraints associated with cramped cockpits are avoided.

While the solar filter 12 has been described as photochromic type of material, it could be constructed of other types of material. For example, it could be made of a type of sensor device such as a transmission type liquid crystal photodetector matrix either of the absorbing or reflecting kind. If reflective, the direction of reflection is oriented out of the normal optical path. Examples of liquid crystal devices of the transmission type are disclosed in U.S. Pat. No. 3,744,879, issued on July 10, 1973 to T. D. Beard et al and U.S. Pat. No. 3,811,180 issued on May 21, 1974 to M. Braunstein.

As illustrated in FIG. 4, the solar filter 12 can be constructed in a different configuration other than a flat plate. Here the solar filter 12 is constructed as an optical prism of photochromic material. Thus, as solar energy focused downstream through the relay optics 14 is focused and concentrated as a spot in the optical prism 50, it causes a small volume of material within the prism to darken thereby blocking solar radiation and preventing it from impinging on the image surface 10 containing the display information and thereby washing out or otherwise affecting the image.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A visible light filter for a head up display which includes a display means for producing an image of display information and an optical system including lens means for directing the image of the display information to the eye of a viewer comprising:

optical filter means positioned between the display means and the lens means which is reversibly responsive to focused visible light directed through the lens means back toward the display means to block the focused visible light and which is transmissive to the display information except at the localized portion where focused visible light is blocked.

2. The device of claim 1 in which said optical filter means is located in the focal plane for the back focal length of said lens means.

3. The device of claim 1 in which said optical filter means is located at about the focal plane for the back focal length of said lens means.

4. The device of claim 1, 2 or 3 in which said optical filter means is constructed of photochromic material.

5. The device of claims 1, 2 or 3 in which said optical filter means is a plate of photochromic material.

6. The device of claims 1, 2 or 3 which said optical filter means is a prismatic optical element constucted of photochromic material.

7. The device of claim 1, 2 or 3 in which optical filter means is a transmission type liquid crystal photodetector matrix.

8. In a head up display operable to superimpose and combine an image of display information on a scene being viewed within an exit pupil comprising:

display means for producing optical display information;

optical means for directing and focusing an image of the display information to an exit pupil; and optical filter means positioned between the display means and the optical means which is reversibly responsive to focused solar radiation directed through the optical means toward to the display means to block the focused solar radiation and which is transmissive to the display information except at the localized portion where focused solar radiation is blocked.

9. The device of claim 8 in which said optical filter means is located in the focal plane for the back focal length of said optical means.

10. The device of claim 8 in which said optical filter means is located near the focal plane for the back focal length of said optical means.

11. The device of claim 8, 9 or 10 in which said optical filter means is constructed of photochromic material.

12. The device of claim 8, 9 or 10 in which optical filter means is a transmission type liquid crystal photodetector matrix.

* * * * *